United States Patent
Sakhardande et al.

(10) Patent No.: US 10,331,442 B2
(45) Date of Patent: Jun. 25, 2019

(54) VISUAL DESIGN EVALUATION

(71) Applicant: TATA CONSULTANCY SERVICES LIMITED, Mumbai, Maharashtra (IN)

(72) Inventors: Prachi Sakhardande, Maharashtra (IN); Meenakshi Dixit, Maharashtra (IN); Prasad Rashinkar, Maharashtra (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 1109 days.

(21) Appl. No.: 14/335,445

(22) Filed: Jul. 18, 2014

(65) Prior Publication Data
US 2015/0040043 A1 Feb. 5, 2015

(30) Foreign Application Priority Data
Jul. 31, 2013 (IN) .......................... 2533/MUM/2013

(51) Int. Cl.
*G06F 8/77* (2018.01)
*G06F 3/0481* (2013.01)
*G06F 9/451* (2018.01)
*G06F 8/70* (2018.01)
*G06F 9/44* (2018.01)
*G06Q 30/02* (2012.01)

(52) U.S. Cl.
CPC .............. *G06F 8/77* (2013.01); *G06F 3/0481* (2013.01); *G06F 8/70* (2013.01); *G06F 9/4443* (2013.01); *G06F 9/451* (2018.02); *G06Q 30/02* (2013.01)

(58) Field of Classification Search
CPC . G06F 3/0481; G06F 8/70; G06F 8/77; G06F 8/38; G06F 9/4443; G06F 9/451; G06Q 30/02
See application file for complete search history.

(56) References Cited

U.S. PATENT DOCUMENTS

| | | | |
|---|---|---|---|
| 9,158,538 B2* | 10/2015 | Nicholls | G06F 8/76 |
| 2012/0005594 A1* | 1/2012 | Lorch | G06F 9/4443 |
| | | | 715/747 |
| 2014/0365397 A1* | 12/2014 | Mitra | G06Q 30/0282 |
| | | | 705/347 |

OTHER PUBLICATIONS

Wei, Wan-Li et al., Web Design and Assessment for E-Commerce, Management and Service Science (MASS), 2010 International Conference on Aug. 24-26, 2010, pp. 1-4.

* cited by examiner

*Primary Examiner* — Jacob D Dascomb
(74) *Attorney, Agent, or Firm* — Lee & Hayes, P.C.

(57) ABSTRACT

The present subject matter relates to evaluation of a visual design of a user interface (UI). The method comprises receiving, from at least one reviewer, a response to a plurality of questions associated with a plurality of dimensions. The plurality of dimensions is indicative of criteria for assessment of the visual design of the UI. Further, an aggregate visual design quality index ($VDI_A$) score for the UI is computed. The $VDI_A$ score is computed based on the response received from the at least one reviewer, and a plurality of weighing factors corresponding to each of the plurality of dimensions. Subsequently, the $VDI_A$ score is compared with a pre-determined benchmark visual design quality index ($VDI_B$) score to evaluate the quality of the visual design of the UI.

15 Claims, 2 Drawing Sheets

VISUAL DESIGN EVALUATION

TECHNICAL FIELD

The present subject matter, in general, relates to visual design and, in particular, relates to method(s) and system(s) for evaluation of visual design of a user interface.

BACKGROUND

Computer-based technologies have increasingly become a ubiquitous part of the daily lives of users. Examples of such technologies include automated teller machines (ATMs), kiosks, and websites. Typically, when users interact with a computer system, they do so via a user interface (UI). The UI enables interaction and serves as a bridge between users and the computing system.

Further, over the last few decades, the Internet has gained widespread popularity as a medium to disseminate knowledge throughout the world. Therefore, various organizations have employed websites and web-based applications for use by people residing at different geographic locations around the world. Various users across the world can connect to an organization by accessing the websites and web-based applications through the UI. The organizations rely heavily on the UIs, such as for the websites and web based applications, to attract more users and support them in the tasks they wish to undertake.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
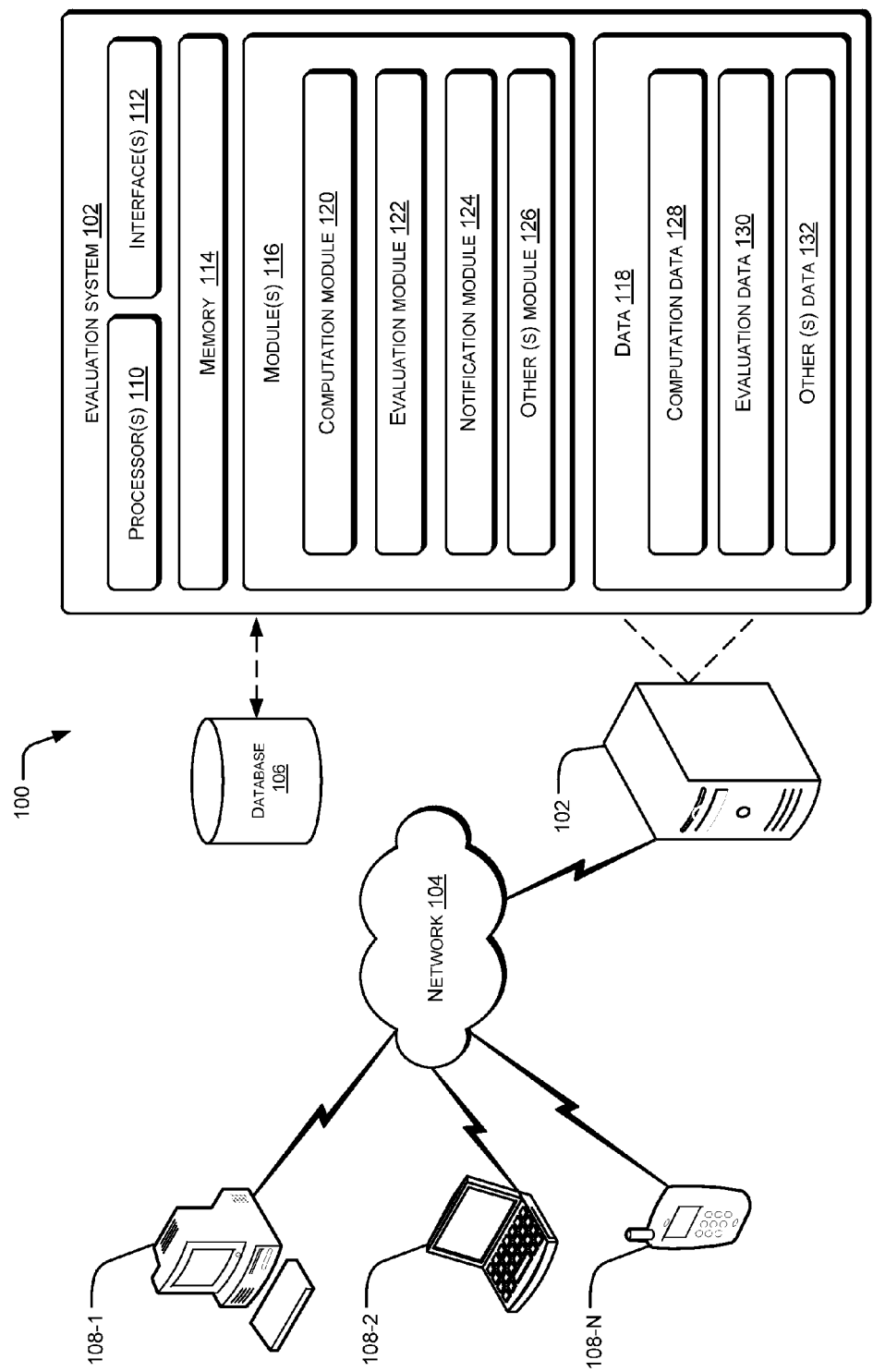
FIG. 1 illustrates a network environment implementing an evaluation system, in accordance with an embodiment of the present subject matter.

System(s) and method(s) for evaluating quality of a visual design of a user-interface(s) are provided. The system(s) and method(s) can be implemented in a variety of computing devices, such as laptops, desktops, workstations, tablet-PCs, notebooks, portable computers, tablet computers, internet appliances, and similar systems. However, a person skilled in the art will comprehend that the embodiments of the present subject matter are not limited to any particular computing system, architecture, or application device, as they may be adapted to new computing systems and platforms as they become available.

Recently, worldwide economic growth has resulted into an immensely competitive industrial environment. Therefore, it is pertinent for the organizations to understand and adapt to the dynamics of the rapidly changing industry.

In recent times, the Internet has emerged as a powerful and effective tool in shaping a path for growth and development of organizations. For example, various organizations have launched their websites to reach out to people residing at various geographic locations across the world. Similarly, there are various applications offering numerous functionalities to users over the Internet. The functionalities provided by such websites and applications are presented to a user through a User Interface (UI). The UI acts as a portal for interaction between a user and an application. In other words, for users, the UI acts as face of an application or a website, and therefore, of a corresponding organization. Consequently, it becomes relevant for organizations to invest their resources in designing and development of the UI.

Visual design of the UI plays a major role in attracting and engaging users. It is relevant for a visual design to ensure that various ideas and information to be conveyed to the users are appropriately presented. For example, in case of an online shopping website, a poor visual design of the UI may not leave a good impression on a customer. As a result, the customer may get discouraged to buy goods using the website. On the other hand, if the visual design of the UI is attractive and user-friendly, it may draw customer's attention and therefore, act as an encouraging factor for a customer to buy products using the website. Therefore, to ensure a good quality of a visual design of the UI, an assessment of the UI may be carried out. The assessment is generally performed by at least one reviewer to evaluate the quality of the visual design of the UI. However, the assessment may get influenced by various subjective factors, such as individual experiences, capability to judge, cultural preferences, maturity and inclination of the at least one reviewer.

Also, based on an individual preference, different reviewers may assess the UI based on their own set of criteria. As a result, there is a lack of standardization in terms of criteria selected for evaluation of quality of visual design of a UI. Therefore, due to varying preferences of each of the plurality of reviewers, the same visual design of a UI may get different evaluation results. As a result, the assessment becomes prominently subjective and is quite often inaccurate and unreliable.

At times, the reviewers may also be stakeholders, and a designer may have to incorporate their suggestions irrespective of the validity of the suggested modifications. Owing to the influence and authority exercised by the stakeholders, the designer may have to make compromises with the quality of a final design of the UI. Therefore, as would be gathered, a consistent, structured and standardized technique and methodology for quantifying, analyzing and assessing a visual design of a UI is not available.

According to the present subject matter, an evaluation system for evaluating a visual design of a user interface (UI), hereinafter referred to as system, is provided. In one implementation, a response, from at least one reviewer, to a plurality of questions associated with a plurality of dimensions may be received. The plurality of dimensions is indicative of criteria for assessment of the visual design of the UI. Based on the response received from the at least one reviewer, and a plurality of weighing factors corresponding to each of the plurality of dimensions, an aggregate visual design quality index ($VDI_A$) score for the UI may be computed. Further, the $VDI_A$ score may be compared with a pre-determined benchmark visual design quality index ($VDI_B$) score to evaluate the quality of the visual design of the UI.

In one implementation, a pre-assessment questionnaire may be provided to a user. The pre-assessment questionnaire may assist in understanding the requirements and expectations of the user. Therefore, the user may be understood as a person having an expertise in the realm of UI requirements. For example, the user may be at least one of a designer of the UI, a person associated with designing of the UI in any way, and a stakeholder. As would be appreciated by a person skilled in the art, once the expectations of the user from the UI may be determined, the UI may be assessed accordingly.

Further, the pre-assessment questionnaire pertains to the visual design of the UI, and may relate to at least one of the plurality of dimensions. In one implementation, the plurality of dimensions may include, but are not limited to design principles, branding, and aesthetics. Therefore, a visual design of the UI may be assessed on the basis of at least one of the design principles, the branding, and the aesthetics.

In one implementation, each of the plurality of dimensions may include a plurality of categories. For example, the dimension "design principles" may include, but is not limited to categories, such as browser and screen resolution, typography, navigation, and hyperlinks. Similarly, each of the dimensions "branding" and "aesthetics" may also include a plurality of categories. In one implementation, each of the plurality of categories may further be disintegrated into a plurality of parameters. For example, the "browser and screen resolution" may include, but is not limited to parameters, such as base resolution, alignment of UI with reference to screen and horizontal scrolling.

After receiving the pre-assessment questionnaire, the user may respond to each of the questions of the pre-assessment questionnaire with at least one reply, such as Yes/No, 1/2/3, and High/Moderate/Low. In one implementation, based on the response to the pre-assessment questionnaire, a plurality of weighing factors may be determined for each of the plurality of dimensions. In another implementation, the plurality of weighing factors may be determined for each of the categories of the dimensions. A weighing factor is indicative of a relevance of the corresponding dimension or the corresponding category for the computation of a $VDI_B$ score, and a $VDI_A$ score for the UI. Therefore, for each UI, determination of corresponding weighing factors allows identification of at least one dimension or at least one category, which is relevant for an assessment of the UI. In addition, assignment of the weighing factors may avoid inaccuracy and inconvenience caused due to consideration of unnecessary and irrelevant dimensions or categories for assessment of the visual design of the UI. Therefore, resources for an assessment of a UI can be utilized optimally and effectively.

In one implementation, following the computation of the plurality of weighing factors, at least one questionnaire including at least one question may be provided to at least one reviewer. The at least one reviewer may be understood as a person having an expertise in the realm of UI quality evaluation. The at least one reviewer may assist in computing the $VDI_B$ score by providing an acceptable score in response to each question of the at least one questionnaire. The acceptable score may be understood as the threshold score for the corresponding question. Based on the plurality of weighing factors, the acceptable scores corresponding to the at least one question may be aggregated to compute the $VDI_B$ score. Therefore, the $VDI_B$ score may be understood as a benchmark score for evaluating quality of visual design of the UI.

Further, the at least one reviewer may assess the UI by responding to the at least one question of the at least one questionnaire. In one implementation, for each of the plurality of dimensions, the at least one questionnaire may be provided to the at least one reviewer. In such an implementation, based on the response of the at least one reviewer, a dimension visual design quality index ($VDI_D$) score for each dimension may be ascertained.

In another implementation, the at least one questionnaire corresponding to each category of each of the plurality of dimensions may be provided to the at least one reviewer. For example, a questionnaire corresponding to a "colors, graphics and icons" category of the dimension "design principles" may include a question "Is the usage of colors, fonts, and spacing in compliance with project designing guidelines?". Similarly, a questionnaire corresponding to a "complementing the brand" category of the dimension "branding" may include a question "Does visual design succeed in promoting the brand?". In such an implementation, the at least one reviewer may respond to the at least one questionnaire by providing a VDI score to each category. Further, the $VDI_D$ score for each dimension may be ascertained on the basis of the VDI scores corresponding to the plurality of the categories, and the corresponding weighing factors.

Subsequently, based on the $VDI_D$ score determined for each of the plurality of dimensions, and the corresponding weighing factors, a UI visual design quality index ($VDI_{UI}$) score may be ascertained. In an implementation, when a plurality of reviewers may assess the UI, each of the plurality of reviewers may provide a $VDI_{UI}$ score for the UI. On the basis of the plurality of $VDI_{UI}$ scores received from the plurality of reviewers, a $VDI_A$ score for the UI may be computed. A $VDI_A$ score is indicative of an average of the plurality of $VDI_{UI}$ scores. Further, as would be appreciated by a person skilled in the art, in an implementation, where one reviewer may access the UI, the $VDI_{UI}$ score and the $VDI_A$ score may have the same value.

Further, each of the $VDI_{UI}$ scores may be compared with the $VDI_A$ score to determine the variation between the pluralities of $VDI_{UI}$ scores received from the plurality of reviewers. In case of significant variations in the $VDI_{UI}$ scores, the assessment may be discarded to eradicate possibility of any irregularity in the assessment. For example, for a UI, $VDI_{UI}$ scores of 45, 55, 60, 70, and 80 may be obtained from five reviewers. Subsequently, on the basis of the $VDI_{UI}$ scores, a $VDI_A$ score of 62 is determined for the UI. Continuing with the present example, a threshold variation value of 10 may be defined for the UI. In other words, if the variation of $VDI_{UI}$ scores from the $VDI_A$ score turns out to be more than 10, the assessment may be discarded. Therefore, the assessment performed in accordance with the abovementioned example may be discarded as the variation is more than 10. In another implementation, a threshold value of $VDI_{UI}$ score may be defined as 50. Therefore, during an assessment of the UI, if any of the $VDI_{UI}$ scores is below 50, the assessment may be discarded. Therefore, an accurate and precise assessment of the UI may be ensured.

Continuing with the present implementation, the $VDI_A$ score may be compared with the $VDI_B$ score for evaluating the quality of the visual design of the UI. In one implementation, when the $VDI_A$ score is greater than or equal to the $VDI_B$ score, the quality of the visual design of the UI is considered acceptable. In another implementation, when the $VDI_A$ score is less than the $VDI_B$ score, a notification may be provided to the user. The notification may indicate that the quality of the visual design of the UI is below a benchmark score and therefore, is not acceptable. In such an implementation, subsequently, a corresponding average score of the VDI scores ascertained, by different reviewers, for each category may be compared with the $VDI_B$ score. If the average VDI score for a category A is less than the $VDI_B$ score, it may indicate that the quality of the UI may be improved with respect to the category A.

In one implementation, for an assessment of a UI, an evaluation report may also be provided to the user. The evaluation report may include details pertaining to at least one of a $VDI_A$ score, a $VDI_B$ score and a list of categories with corresponding VDI scores. Further, the evaluation report may provide suggestions for improving the quality of the UI. For example, the evaluation report may include tabulation of categories having corresponding VDI score less than the $VDI_B$ score. Therefore, based on the evaluation report, the user may identify the areas of the UI which can be improved. Therefore, a UI can be modified and improved accordingly.

Further, in one implementation, for an assessment of a UI, corresponding VDI scores, $VDI_A$ scores, and $VDI_B$ scores may be determined on a scale of 1-100. For example, a $VDI_B$ score for a UI may be determined to be 65. Therefore, a VDI score and a $VDI_A$ score equal or more than 65 may be considered acceptable.

In one implementation, the at least one reviewer assisting in computing the $VDI_B$ score may be different from the at least one reviewer assessing the UI and providing the corresponding $VDI_{UI}$ scores. Appointing different reviewers for computation of the $VDI_B$ score and the $VDI_{UI}$ score may ensure a fair, unbiased and accurate determination of the $VDI_B$ score and the $VDI_{UI}$ score.

As would be gathered, determination of VDI scores, $VDI_A$ scores, and $VDI_B$ scores according to the present subject matter can be considered as a standard for evaluating quality of various UIs. Similarly, a $VDI_B$ score can also be considered constant for all types of UI. Therefore, a standardized mechanism is provided for an assessment of a UI, as computing $VDI_A$ score and $VDI_B$ score may provide standard criteria for evaluating quality of visual design of the UI. In one implementation, based on the features expected from a UI, $VDI_B$ score can be determined individually for UIs pertaining to a specific industry. For example, a $VDI_B$ score for a UI of a college result website may be different than a $VDI_B$ score for an online shopping website. Therefore, for UIs relating to different fields, a specific benchmark score may be evaluated based on the requirements.

Also, a standardized and comprehensive scale for evaluation of quality of visual design of a UI eliminates a possibility of an error or discrepancies in an assessment of a UI due to individual experiences, capability to judge, cultural preferences, maturity and inclination of the plurality of reviewers.

These and other advantages of the present subject matter would be described in greater detail in conjunction with the following figures. While aspects of described system(s) and method(s) for evaluating quality of a visual design of a user interface can be implemented in any number of different computing systems, environments, and/or configurations, the embodiments are described in the context of the following exemplary system(s).

FIG. 1(a) illustrates a network environment 100 implementing an evaluation system 102, also referred to as system 102, according to an embodiment of the present subject matter. In the network environment 100, the system 102 is connected to a network 104. Further, the system 102 is connected to a database 106. Additionally, the network environment 100 includes one or more client devices 108-1, 108-2 . . . 108-N, collectively referred to as client devices 108 and individually referred to as client device 108, connected to the network 104. In one implementation, the client device 108 may be used to run registered processes that are monitored by the system 102. In another implementation, the client device 108 may be used to view the logs pertaining to the execution of the registered processes. In yet another implementation, the client device 108 may be used for both purposes.

The system 102 can be implemented as any set of computing devices connected to the network 104. For instance, the system 102 may be implemented as workstations, personal computers, desktop computers, multiprocessor systems, laptops, network computers, minicomputers, servers, and the like. In addition, the system 102 may include multiple servers to perform mirrored tasks for users.

Furthermore, the system 102 can be connected to the client devices 108 through the network 104. Examples of the client devices 108 include, but are not limited to personal computers, desktop computers, smart phones, PDAs, and laptops. Communication links between the client devices 108 and the system 102 are enabled through various forms of connections, for example, via dial-up modem connections, cable links, digital subscriber lines (DSL), wireless or satellite links, or any other suitable form of communication.

Moreover, the network 104 may be a wireless network, a wired network, or a combination thereof. The network 104 can also be an individual network or a collection of many such individual networks interconnected with each other and functioning as a single large network, e.g., the internet or an intranet. The network 104 can be implemented as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other. Further, the network 104 may include network devices, such as network switches, hubs, routers, host bus adapters (HBAs), for providing a link between the system 102 and the client devices 108. The network devices within the network 104 may interact with the system 102 and the client devices 108 through communication links.

In said embodiment, the system 102 includes one or more processor(s) 110, interface(s) 112, and a memory 114 coupled to the processor 110. The processor 110 can be a single processing unit or a number of units, all of which could also include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 114.

The interfaces 112 may include a variety of software and hardware interfaces, for example, interface for peripheral device(s), such as a keyboard, a mouse, an external memory, and a printer. Further, the interfaces 112 may enable the system 102 to communicate with other computing devices, such as web servers, and external data repositories, such as the database 106, in the network environment 100. The interfaces 112 may facilitate multiple communications within a wide variety of protocols and networks, such as a network, including wired networks, e.g., LAN, cable, etc., and wireless networks, e.g., WLAN, cellular, satellite, etc. The interfaces 112 may include one or more ports for connecting the system 102 to a number of computing devices.

The memory 114 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The non-transitory computer-readable medium, however, excludes a transitory, propagating signal. The memory 114 also includes module(s) 116 and data 118.

The module(s) 116 include routines, programs, objects, components, data structures, etc., which perform particular tasks or implement particular abstract data types. In one implementation, the module(s) 116 includes a computation module 120, an evaluation module 122, a notification module 124 and other module(s) 126. The other module(s) 126 may include programs or coded instructions that supplement applications and functions of the system 102.

On the other hand, the data 118, inter alia serves as a repository for storing data processed, received, and generated by one or more of the module(s) 116. The data 118 includes, for example, computation data 128, evaluation data 130 and other data 132. The other data 132 includes data generated as a result of the execution of one or more modules in the module(s) 116.

In one implementation, the system 102 may evaluate quality of a visual design of a user interface (UI). The system 102 may assess the UI on the basis of a plurality of dimensions. The plurality of dimensions may include, but are not limited to design principles, branding and aesthetics. Each of the plurality of dimensions may further include at least one category. For example, the design principles may include, but are not limited to categories, such as "browser and screen resolution", "visual alignment", "colors, graphics, and icons", "typography", "navigation", "table", "format", "hyperlinks", "buttons" and "page elements".

Similarly, the branding may include, but are not limited to categories, such as "adherence to brand guidelines", "brand representation", "complementing the brand", "cultural influence", "uniqueness of brand" and "demographics". Further, the aesthetics may include, but are not limited to "emotional appeal" and "perception".

In one implementation, each of the categories may further include a plurality of parameters. For example, the "browser and screen resolution" may include, but are not limited to parameters, such as base resolution, alignment of UI with reference to screen and horizontal scrolling. Similarly, the "adherence to brand guidelines" may include, but are not limited to imagery, brand logo, and social background of users.

In one implementation, the computation module 120 may generate and provide a pre-assessment questionnaire to a user having an expertise in the realm of UI requirements. For example, the user may include any of a designer of the UI, a stakeholder and a person involved in designing of the UI in any way.

The pre-assessment questionnaire may include at least one question pertaining to details of the UI. For example, the at least one question may relate to the at least one of the plurality of dimensions. In another implementation, the pre-assessment questionnaire may include a specific set of questions, which may be applicable for all types of UIs. Therefore, irrespective of the type of UI, the computation module 120 may provide the pre-assessment questionnaire including an exhaustive set of questions to the user. In a further implementation, the system 102 may categorize different types of UIs based on their functionalities or field of interest. For example, UIs may be categorized as medical UIs, employment portals UIs, examination results UIs etc. In such an implementation, the computation module 120 may generate and provide a pre-assessment questionnaire including a plurality of questions, which are applicable for a specific type of UIs. Therefore, the pre-assessment questionnaire may be provided to a user based on the type of UI to be assessed.

In one implementation, the computation module 120 may generate such type-specific pre-assessment questionnaires based on an opinion of an expert in the realm of assessment of UIs. In another implementation, based on historical records available in an in-house database, the computation module 120 may generate and provide a pre-assessment questionnaire specific to a certain type of UI.

In table 1, a pre-assessment questionnaire including an exhaustive set of questions, which are applicable for all types of UIs, is provided. Further, as would be appreciated by a person skilled in the art, the pre-assessment questionnaire is provided for providing a better understanding and clarity about the present subject matter, and should not be construed as limiting.

TABLE 1

PRE-ASSESSMENT QUESTIONNAIRE

| | |
|---|---|
| Q.1 | Is the visual design meant for a specific browser and resolution? |
| Q.2 | How many primary menu items are available on this page? |
| Q.3 | What is the margin for error when using this application? |
| Q.4 | Is it a widely used application, where the target user set is not limited? |
| Q.5 | Do you want the application to portray your organization's brand well? |
| Q.6 | Is visual appeal important to you? |
| Q.7 | Are branding guidelines defined for the application? |
| Q.8 | Is the application created for a specific geometry? |

As shown in the abovementioned exemplary pre-assessment questionnaire, there are 8 questions relating to the plurality of dimensions, e.g., the design principles, the branding, and the aesthetics. For example, Q.1 relates to the design principles, in particular, to the "browser and screen resolution" category of the design principles. Similarly, Q.5 and Q.6 relates to the branding and the aesthetics, respectively.

Further, the user may respond to each of the 8 questions with at least one of the replies such as Yes/No, 1/2/3, and High/Moderate/Low. For example, for responding to Q.3, the computation module 120 may allow the user to choose one of a plurality of options, such as "High", "Moderate" and "Low". Similarly, for responding to Q.1, Q.4, Q.5, Q.6, Q.7 and Q.8, the computation module 120 may allow the user to choose one of a plurality of options, such as "Yes", "No" and "To an extent". Further, for responding to Q.2, the computation module 120 may allow the user to choose one of a plurality of options, such as "1", "2", and "3".

In one implementation, based on the response of the pre-assessment questionnaire, the computation module 120 may ascertain a plurality of weighing factors for each of the plurality of dimensions. A weighing factor is indicative of an importance of the corresponding dimension or the corresponding category for the evaluation of the quality of a UI. In other words, a weighing factor for a dimension may indicate a percentage of a score of the corresponding dimension that can be utilized for determining the quality of the UI. In one implementation, the computation module 120 may ascertain the plurality of weighing factors for each category of each of the plurality of dimensions.

In one implementation, following the ascertaining of the plurality of weighing factors, the computation module 120 may provide to the at least one reviewer, the at least one questionnaire including a plurality of questions pertaining to the UI. Further, the computation module 120 may compute a benchmark aggregate visual design quality index ($VDI_B$) score. A $VDI_B$ score may be understood as a benchmark score for quality of visual design of a UI. In other words, for a UI to be acceptable with regard to the quality, the corresponding $VDI_B$ score may act as a threshold score.

In one implementation, the computation module 120 may compute the $VDI_B$ score based on at least one of an effectiveness factor and an adherence frequency factor. The effectiveness factor and the adherence frequency factor can be tabulated in an acceptance matrix. The effectiveness factor may be understood as a measure of the effectiveness of implementation of a parameter associated with the corresponding question. Similarly, the adherence frequency factor may be understood as a measure of consistency or frequency of adherence of a parameter with various guidelines.

In table 2, an acceptance matrix tabulating the effectiveness factor and the adherence frequency factor is provided. Further, as would be appreciated by a person skilled in the art, the acceptance matrix is provided for providing a better understanding and clarity about the present subject matter, and should not be construed as limiting.

TABLE 2

| | Effectiveness | | |
| --- | --- | --- | --- |
| Frequency | Less/Not Effective (−2) | Sufficiently Effective (0) | Very Effective (+1) |
| No/Never (0) | −2 | 0 | 1 |
| Rarely (1) | −1 | 1 | 2 |
| Sometimes (2) | 0 | 2 | 3 |
| Mostly (3) | 1 | 3 | 4 |
| Always (4) | 2 | 4 | 5 |

In one implementation, for computation of the $VDI_B$ score, the computation module 120 may provide, in response to each question of the at least one questionnaire, one of the ratings provided in the table 2. The ratings provided to each question for computation of the $VDI_B$ score may be considered as an acceptable rating in response to the corresponding question. Further, based on the plurality of weighing factors and the ratings provided to the at least one question of the at least one questionnaire, the computation module 120 may determine the $VDI_B$ score for the UI.

In another implementation, following the computation of the $VDI_B$ score, the computation module 120 may determine the $VDI_A$ score. The computation module 120 may determine the $VDI_A$ score on the basis of the effectiveness factor and the adherence frequency factor. In one implementation, more than one reviewer may be appointed for the determination of the $VDI_A$ score. For example, for assessing the UI with respect to the "design principles" dimension, a reviewer possessing expertise in designing realm may be appointed. Similarly, for assessing the UI with respect to the "branding" dimension, a stakeholder may be appointed, as the stakeholder may possess better understanding of the corresponding brand. Further, for assessing the UI with respect to the "aesthetics" dimension, reviewers having an expertise in aesthetics realm may be appointed. Therefore, an accuracy of the evaluation may be enhanced by appointing reviewers with expertise in a specific field of the evaluation.

As shown in table 2, in response to a question of the at least one questionnaire, if the at least one reviewer assesses an effectiveness of visual design of a UI as "less effective" or "not effective", the at least one reviewer may assign a rating of −2 to the UI. Further, if the at least one reviewer assesses the effectiveness of the UI as "sufficiently effective" and "very effective", the at least one reviewer may assign a rating of 0 and +1, respectively. Similarly, the at least one reviewer may assign a rating of 0, 1, 2, 3 and 4, if the at least one reviewer assesses a frequency of adherence of the UI as "never", "rarely", "sometimes", "mostly", and "always", respectively. For example, in response to a question, if the effectiveness is rated as "sufficiently effective" (0), and frequency of adherence is rated as "rarely" (1), therefore, the overall rating given to the UI may be 1 (=1+1). Further, based on the plurality of weighing factors and the ratings provided by the at least one reviewer in response to each question of the at least one questionnaire, the computation module 120 may ascertain a dimension visual design quality index (VDI) score for each dimension.

In yet another implementation, the computation module 120 may provide to the at least one reviewer, at least one questionnaire corresponding to at least one category of at least one dimension. The at least one questionnaire may include at least one question pertaining to the corresponding category. For example, a questionnaire pertaining to the "format" category of the design principles may include a question "Are rows and columns of the table differentiated by lines or alternate colors?". Similarly, a questionnaire pertaining to the "brand representation" category of the branding may include a question "Is the color scheme complimenting the logo and brand identity?".

In each of a table 3 and a table 4, a questionnaire including a plurality of questions corresponding to each of the categories of the design principles dimension and the branding dimension is provided, respectively. Further, as would be appreciated by a person skilled in the art, the questionnaires are provided for providing a better understanding and clarity about the present subject matter, and should not be construed as limiting.

TABLE 3

| CATEGORIES | QUESTIONNAIRE |
| --- | --- |
| Browser & Screen Resolution | Base resolution is 1024 × 786 and above or as per the client requirement. UI is center aligned to the screen irrespective of screen resolution. |
| Visual Grid + Visual alignment | For the resolution 1024 × 768, the safe area is 960 and a 12 column grid layout with 60 px column and 20 column gutter<br>For the resolution 1280 × 1024, the safe area is 1180 and a 12 column grid layout with 80 px column and 20 column gutter |

TABLE 3-continued

| CATEGORIES | QUESTIONNAIRE |
|---|---|
| Color, Graphics & Icons | Usage of colors, fonts, Logo, spacing & other such specifications is as defined in the project branding guidelines<br>Provide color contrast between text and background images<br>Consistent colors for a similar set of elements such as Hyperlinks, buttons etc. are used |
| Typography | Number of Fonts are limited to 3<br>Preferred System fonts are used - Arial, Verdana, Tahoma, Trebuchet<br>Usage of All Capital letters is minimum. |
| Page Header/ Main Navigation | Minimum spacing/padding around the Logo is 10 px or as defined in the project style guide.<br>Minimum header height is 50 px to accommodate Logo + Global Links + Search component and other global info if any or as defined in the project style guide. |
| Table | Minimum height of a Breadcrumb is 20 px or as defined in the project branding guidelines.<br>Minimum height of Table Header is 25 px or as defined in the project branding guidelines. |
| Format | Table Rows and Columns are differentiated either by lines or alternate colors.<br>Minimum spacing between Form Label and Form input element is 10px or as defined in the project branding guidelines. |
| Hyperlinks | Notifications, error messages, alerts are in different styles supported by relevant icons.<br>Main Navigation links are of one consistent font style, size and color. |
| Page Elements | Active Buttons are not looking disabled and do not resemble form fields.<br>Rounded corner radius are consistent throughout the set of elements such as Buttons, Images, Tables, Content box etc.<br>Divider lines or separators are consistent throughout the site. |

TABLE 4

| CATEGORIES | QUESTIONNAIRE |
|---|---|
| Adherence to brand guidelines | Do 'Branding elements' (e.g. colors, signs, symbols, design patterns, typefaces) follow the design standards (hex codes, fonts, proportions) defined by the brand owner?<br>Has the consistency been achieved by using specific colors, fonts and other graphic elements that are recognized by end users in relationship with a particular concept/company/product/service/business?<br>Does imagery [if any] follow the hard and soft guidelines published in the brand guidelines? |
| Brand Representation | Is the logo well designed, and in line with the identity of the organization or product?<br>Is the color scheme complementing the logo and brand identity?<br>Are fonts complementing the logo and brand identity? |
| Complementing the Brand | Does visual design succeed in promoting the brand?<br>Does visual design enhance the brand recall of the product/organization? |
| Cultural Influence | Does Visual Design take cognizance of region or specific culture through colors, graphics or any other visual protocol?<br>Does Visual Design portray the Company's Culture, with the usage of colors, imagery, icons or other visual elements? |
| Brand Uniqueness | The UI appears to be very unique in terms of branding<br>Does this UI look fresh/new unlike anything you have seen before? |
| User Demographics | Is the branding appropriate considering age group of the users?<br>Is the branding appropriate considering education of the users?<br>Is the branding appropriate considering the social background of the users?<br>Is the branding appropriate considering communication skills and language of the users? |

As shown in table 3 and table 4, there are a plurality of questions pertaining to each of the categories of the design principles and the branding, respectively. The at least one reviewer may assess the UI by responding to the plurality of questions. In one implementation, the at least one reviewer may assess the UI, based on the effectiveness factor and the adherence frequency factor. With reference to the adherence frequency factor, the at least one reviewer may respond to each question by selecting one of a plurality of options, such as "Always", "Mostly", "Sometimes", "Rarely", "No", and "Not applicable". In one implementation, the at least one reviewer may assign a rating of 0, 1, 2, 3, and 4 for "No", "Rarely", "Sometimes", "Mostly", and "Always", respectively. For example, if frequency of adherence of a specific question of the questionnaire of either of the design principles and the branding is "Rarely", the at least one reviewer may assign a rating of "+1" to the question.

Similarly, with reference to the effectiveness factor, the at least one reviewer may respond to each question by selecting one of a plurality of options, such as "Not effective", "Sufficiently effective", "Very effective", and "Not applicable". In one implementation, the at least one reviewer may assign a rating of −2, 0, and +1 for "Less effective" or "Not effective", "Sufficiently effective", and "Very effective", respectively.

In a table 5, a questionnaire, can also be referred to as a feedback form, including a plurality of questions corresponding to each of the categories of the aesthetics is provided. Further, as would be appreciated by a person skilled in the art, the questionnaire is provided for providing a better understanding and clarity about the present subject matter, and should not be construed as limiting.

TABLE 5

STATEMENTS/QUESTIONNAIRE

| | |
|---|---|
| Q.1 | Select an adjective that matches closely to your views on the Design. |
| Q.2 | The design is so appealing that it persuades me to use the application. |
| Q.3 | It becomes difficult to scan or read the content. |
| Q.4 | Images, Icons, UI Elements etc. appear to be from the same design scheme. |
| Q.5 | The design does not look well integrated. |
| Q.6 | All the colors and shapes used in the design are fresh. |
| Q.7 | I am getting distracted from the main content of the page. |
| Q.8 | I can relate to the company image through the design. |
| Q.9 | Some of the elements can be designed better to make branding stronger. |
| Q.10 | I can think of all primary brand attributes just by looking at the overall design. |
| Q.11 | Logo/Name is the ONLY element that represents the organization's brand. |

With reference to the abovementioned questionnaire pertaining to the aesthetics, the at least one reviewer may assess the UI based on the effectiveness factor. Further, the at least one reviewer may respond to each question by selecting one of a plurality of options, such as "Strongly agree", "Agree", "Can't say", "Disagree", "Fresh and exciting", "Calm", "Violent", and "Sad/Depressing". For example, for Q.1, the at least one reviewer may respond by selecting one of the "Fresh and exciting", "Calm", "Violent", and "Sad/Depressing". On the other hand, for Q.2 to Q.11, the at least one reviewer may respond by selecting one of the "Strongly agree", "Agree", "Can't say", and "Disagree".

Therefore, the computation module 120 may receive, from the at least one reviewer, the response to each of the plurality of questions of the questionnaires pertaining to each of the plurality of dimensions, i.e., the design principles, the branding, and the aesthetics.

Further, based on the response of the at least one reviewer, the computation module 120 may ascertain a visual design quality index (VDI) score corresponding to each category of each of the plurality of dimensions. In one implementation, the computation module 120, based on the VDI scores and the corresponding weighing factors, ascertains a dimension visual quality design index (VDI) score for each of the dimensions. Subsequently, based on the $VDI_D$ scores and the corresponding weighing factors, the computation module 120 may compute a UI visual design quality index ($VDI_{UI}$) score. In one implementation, the computation module 120 may compute VDI scores, $VDI_D$ scores, $VDI_{UI}$ score, and $VDI_B$ score on a scale of 0-100.

In one implementation, where a plurality of reviewers may be involved in the assessment of the UI, the computation module 120 may evaluate an aggregate visual design quality index ($VDI_A$) score, based on the $VDI_{UI}$ scores received from the plurality of reviewers. In case, when the $VDI_{UI}$ scores assigned by different reviewers exhibit huge variations with reference to the $VDI_A$ score, the assessment may be discarded. Further, as would be appreciated by a person skilled in the art, in an implementation, where one reviewer may assess the UI, the $VDI_A$ score and the $VDI_{UI}$ score may have the same value.

In a table 6, various assessment scores determined during assessment of the UI are shown with their corresponding description. Further, as would be appreciated by a person skilled in the art, the table 6 is provided for providing a better understanding and clarity about the present subject matter, and should not be construed as limiting.

TABLE 6

| Sr. no. | Score | Description |
|---|---|---|
| 1. | VDI score | Visual design quality index for a category |
| 2. | $VDI_D$ score | Visual design quality index for a dimension |
| 3. | $VDI_{UI}$ score | Visual design quality index for a UI (provided by a reviewer) |
| 4. | $VDI_A$ score | Average visual design quality index score for a UI |
| 5. | $VDI_B$ score | Benchmark visual design quality index |

Continuing with the present implementation, alternatively, the computation module 120 may conduct a two tailed t-test. The two tailed t-test may use ratings assigned to the UI by the plurality of reviewers. Further, the two tailed t-test may include randomly dividing the plurality of reviewers into two groups. The t-test may be performed to understand variability in data points of the two groups. The larger the variability, lesser is the accuracy of $VDI_A$ score and therefore, the visual design of the UI may be assumed to have varied responses amongst users.

Illustrated below is a two tailed t-test wherein the two tailed t-test is defined by two hypotheses that include:
$H_0$=both the groups have same $VDI_A$
$H_1$=one of group has significantly higher $VDI_A$
Wherein each group constitutes a randomly selected set of $VDI_A$ assessed for the same design by a formula:

$$t = \frac{\bar{x}_1 - \bar{x}_2 - \Delta}{\sqrt{\frac{s_1^2}{n_1} + \frac{s_2^2}{n_2}}}$$

Where,
$x_1$ and $x_2$ are means of the two samples,
$\Delta$ is the hypothesized difference between the population means (0 if testing for equal means), $s_1$ and $s_2$ are the standard deviations of the two samples, and $n_1$ and $n_2$ are the sizes of the two samples.

In an implementation, when 't' is greater than 0.05, a null hypothesis, i.e., $H_0$ may be achieved. The null hypothesis may indicate that the two groups have arrived at a similar $VDI_A$ score. In an implementation, when 't' comes out to be lesser than 0.05, the assessment of the UI may be discarded. Therefore, to avoid a possibility of an erroneous assessment, the assessment of the UI may be performed again. In other words, an accurate and precise assessment of the UI is ensured. In one implementation, the computation module 120 stores the data in the computation data 128.

Further, the evaluation module 122 may compare the $VDI_A$ score with the $VDI_B$ score for evaluating the quality of the visual design of the UI. In one implementation, if the $VDI_A$ score is less than the $VDI_B$ score, the notification module 124 may provide a notification to the user. The notification may indicate that the quality of the UI is below a benchmark score and therefore, is not acceptable. In one implementation, the evaluation module 122 may compare the VDI scores determined for each category with the $VDI_B$ score. If the VDI score for a category is less than the $VDI_B$ score, it may indicate that the quality of the UI may be improved with respect to that category. In one implementation, the evaluation module 122 may store the data in the evaluation data 130.

In one implementation, the notification module 124 may provide an evaluation report to the user. The evaluation report may include, but are not limited to details pertaining to VDI scores, $VDI_D$ scores, $VDI_{UI}$ score, $VDI_A$ score, and $VDI_B$ score. Further, the evaluation report may include suggestions for modification and improvement of the visual design of the UI. The suggestions may include but are not limited to corrective measures to improve the quality of visual design of the UI. In one implementation, the notification module 124 stores the data in the evaluation data 130.

Figure 2:
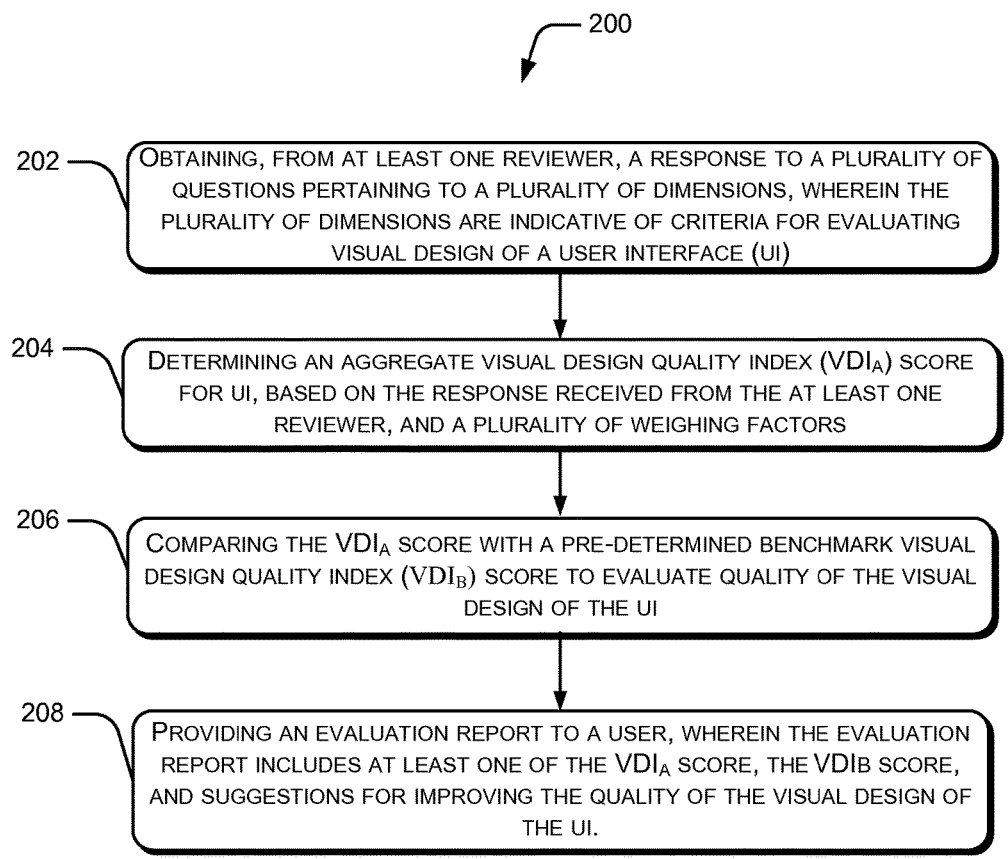
FIG. 2 illustrates a method for evaluating quality of a visual design of a user-interface(s), in accordance with an embodiment of the present subject matter.

FIG. 2 illustrates a method 200 for evaluating quality of a visual design of a user interface (UI), according to one embodiment of the present subject matter. The method 200 may be implemented in a variety of computing systems in several different ways. For example, the method 200, described herein, may be implemented using an evaluation system 102, as described above.

The method 200, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method 200.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. It will be understood that even though the method 200 is described with reference to the system 102, the description may be extended to other systems as well.

In one implementation, the system 102 may evaluate quality of a visual design of a user interface (UI). The UI may be assessed on the basis of a plurality of dimensions. The plurality of dimensions may include, but are not limited to design principles, branding and aesthetics. Each of the plurality of dimensions may further include at least one category, wherein the at least one category may further include at least one parameter.

Further, a pre-assessment questionnaire including a plurality of questions pertaining to details of the UI, may be provided to a user. For example, the at least one questionnaire may relate to at least one of the plurality of dimensions. Also, a user may include a person having an expertise in the UI requirements realm, such as a designer of the UI, a stakeholder, and a person involved in designing of the UI in any way.

In one implementation, the pre-assessment questionnaire may include an exhaustive set of questions, which may be applicable for all types of UIs. In another implementation, various UIs may be categorized based on their functionalities or field of interest. For example, UIs may be categorized as medical UIs, employment portals UIs, examination results UIs, etc. In such an implementation, the pre-assessment questionnaire may include a plurality of questions, which are applicable for a specific type of UIs. Therefore, the pre-assessment questionnaire may be provided to a user based on the type of UI to be assessed.

In one implementation, such type-specific pre-assessment questionnaires may be provided to the user, based on an expert opinion. In another implementation, based on historical records available in an in-house database, the pre-assessment questionnaire specific to a certain type of UI may be provided to the user.

Further, the user may respond to each of the plurality of questions with at least one of replies, such as Yes/No, 1/2/3, and High/Moderate/Low. Further, based on the response of the pre-assessment questionnaire, a plurality of weighing factors for each of the plurality of dimensions may be ascertained. A weighing factor is indicative of an importance of the corresponding dimension or the corresponding category for the evaluation of the quality of a UI. In one implementation, the plurality of weighing factors may be ascertained for each of the categories of each of the dimensions. At block 202, at least one questionnaire corresponding to at least one category of at least one dimension may be provided to the at least one reviewer. The at least one questionnaire may include at least one question pertaining to the corresponding category. For example, a questionnaire pertaining to a "format" category of the design principles may include a question "Are rows and columns of the table differentiated by lines or alternate colors?". Similarly, a questionnaire pertaining to a "brand representation" category of the branding may include a question "Is the color scheme complimenting the logo and brand identity?". In one implementation, at least one questionnaire corresponding to each of the plurality of dimensions may be provided to the at least one reviewer.

In one implementation, a reviewer may provide, in response to each question of the at least one questionnaire, an acceptable score for computation of a benchmark aggregate visual design quality index ($VDI_B$) score. Further, based on the plurality of weighing factors and the acceptable scores provided for the plurality of questions, the $VDI_B$ score may be determined. A $VDI_B$ score may be understood as a benchmark score for quality of visual design of a UI. Further, the $VDI_B$ score may be computed based on at least one of an effectiveness factor and an adherence frequency factor.

In another implementation, the at least one reviewer may assess the UI by responding to the plurality of questions of the at least one questionnaire corresponding to each of the plurality of dimensions for computing the $VDI_A$. Further, the at least one reviewer may respond to the at least one questionnaire corresponding to each of the design principles and the branding, based on at least one of the effectiveness factor and the adherence frequency factor. With reference to the adherence frequency factor, the at least one reviewer may respond to each question by selecting one of a plurality of options, such as "Always", "Mostly", "Sometimes", "Rarely", "No", and "Not applicable". Further, the at least one reviewer may assign a rating of 0, 1, 2, 3, and 4 for "No", "Rarely", "Sometimes", "Mostly", and "Always", respectively.

Similarly, with reference to the effectiveness factor, the at least one reviewer may respond to each question by selecting one of a plurality of options, such as "Not effective", "Sufficiently effective", "Very effective", and "Not applicable". In one implementation, the at least one reviewer may assign a rating of −2, 0, and +1 for "Less effective" or "Not effective", "Sufficiently effective", and "Very effective", respectively.

However, for the at least one questionnaire pertaining to the aesthetics, the at least one reviewer may access the UI and respond, based on the effectiveness factor. For example, the at least one reviewer may respond to each question by selecting one of a plurality of options, such as "Strongly agree", "Agree", "Can't say", "Disagree", "Fresh and exciting", "Calm", "Violent", and "Sad/Depressing".

Therefore, as would be gathered, the $VDI_A$ score and the $VDI_B$ score can be computed based on the effectiveness factor and the adherence frequency factor. As would be gathered, the response to the plurality of questions associated with the plurality of dimensions, such as the design principles, the branding, and the aesthetics, may be received from the at least one reviewer. In an example, a computation module 120 of the system 102 may receive the response to the plurality of questions associated with the plurality of dimensions, from the at least one reviewer.

At block 204, based on the response of the at least one reviewer, a visual design quality index (VDI) score corresponding to each category of each of the plurality of dimensions may be ascertained. In one implementation, based on the VDI scores and the corresponding weighing factors, a dimension visual quality design index (VDI) score for each of the dimensions may be determined. Subsequently, based on the $VDI_D$ scores and the corresponding weighing factors, a UI visual design quality index ($VDI_{UI}$) score may be evaluated.

Further, in an implementation, when a plurality of reviewers may assess the UI, each of the plurality of reviewers may provide a corresponding $VDI_{UI}$ score to the UI. Continuing with the present implementation, based on the $VDI_{UI}$ scores, an aggregate visual design quality index ($VDI_A$) score for the UI may be computed. The $VDI_A$ score is indicative of an average value of the plurality of $VDI_{UI}$ scores. In one implementation, the VDI scores, the $VDI_D$ scores, the $VDI_A$ score, the $VDI_{UI}$ scores and the $VDI_B$ score can be ascertained on a scale of 0-100.

In one implementation, when the $VDI_{UI}$ scores assigned by different reviewers exhibit huge variations with reference to the $VDI_A$ score, the assessment may be discarded to avoid a possibility of an erroneous assessment. Therefore, an accurate and precise assessment of the UI is ensured. In an example, a computation module 120 of the system 102 may ascertain the $VDI_{UI}$ score, based on the response received from the at least one reviewer, and the plurality of weighing factors corresponding to each of the plurality of dimensions.

At block 206, the $VDI_A$ score may be compared with the $VDI_B$ score for evaluating the quality of the visual design of the UI. The comparison may be performed to evaluate whether the $VDI_A$ score is greater or smaller than $VDI_B$ score. In one implementation, when the $VDI_A$ score is equal to or greater than the $VDI_B$ score, the quality of the UI may be considered acceptable. On the other hand, when the $VDI_A$ score is less than the $VDI_B$ score, the quality of the UI may be considered below a benchmark score and therefore, may not be acceptable.

Further, in such an implementation, the VDI scores corresponding to each of the categories may be compared with the $VDI_B$ score. Subsequently, the categories with VDI score less than the $VDI_B$, may be considered as the aspects where the UI can be modified and improved. In an example, an evaluation module 122 of the system 102 may compare the $VDI_A$ score with the $VDI_B$ score for evaluating the quality of the visual design of the UI.

At block 208, an evaluation report may be provided to the user. The evaluation report may include, but are not limited to details pertaining to VDI scores, $VDI_D$ scores, $VDI_{UI}$ scores, $VDI_A$ score, and $VDI_B$ score. Further, the evaluation report may include suggestions for modification and improvement of the visual design of the UI. In an example, a notification module 124 of the system 102 may provide the evaluation report to the user.

Although implementations of a method for evaluating a visual design of a user interface (UI) have been described in language specific to structural features and/or methods, it is to be understood that the present subject matter is not necessarily limited to the specific features or methods described.

We claim:

1. A computer implemented method for evaluating quality of a visual design of a user interface (UI), the method comprising:
   receiving, from at least one reviewer, a response to a plurality of questions associated with a plurality of dimensions, the plurality of dimensions being indicative of criteria for assessment of the visual design of the UI;
   computing an aggregate visual design quality index ($VDI_A$) score for the UI, wherein the $VDI_A$ score is computed based on the response received from the at least one reviewer, and a plurality of weighing factors corresponding to each of the plurality of dimensions; and
   comparing the $VDI_A$ score with a pre-determined benchmark visual design quality index ($VDI_B$) score to evaluate the quality of the visual design of the UI,
   wherein the computing further comprises:
      obtaining, from the at least one reviewer, in response to the plurality of questions, at least one visual design quality index (VDI) score corresponding to at least one category;
      ascertaining, based on the at least one VDI score, a dimension visual design quality index ($VDI_D$) score for each of the plurality of dimensions; and
      computing, at least one UI visual design index ($VDI_{UI}$) score based on the $VDI_D$ score and the corresponding weighing factors, for evaluating the $VDI_A$ score;
   providing an evaluation report to a user including at least one of the $VDI_A$ score, the at least one VDI score, the $VDI_D$ score corresponding to each dimension, the at least one $VDI_{UI}$, the $VDI_B$ score, and suggestions with corrective measures for improving the quality of the visual design of the UI, wherein the suggested corrective measures are implemented in the visual design of UI,
   wherein the computation of the $VDI_A$ score and the $VDI_B$ score provides standard criteria for evaluating the quality of the visual design of the UI, and the $VDI_A$ score and the $VDI_B$ score, the $VDI_{UI}$ score, the $VDI_D$ score are computed on a scale.

2. The method as claimed in claim 1, wherein the plurality of dimensions includes at least one of a design principle, a branding, and aesthetics.

3. The method as claimed in claim 1, wherein each of the plurality of dimensions includes the at least one category, and wherein the at least one category further includes at least one parameter.

4. The method as claimed in claim 1 further comprising receiving, from the user, a response to a pre-assessment questionnaire, wherein the pre-assessment questionnaire pertains to details of the UI.

5. The method as claimed in claim 4 further comprising determining the plurality of weighing factors based on the response to the pre-assessment questionnaire.

6. An evaluation system for evaluating quality of a visual design of a user interface (UI), the evaluation system comprising:
a processor; and
a memory coupled to the processor, the memory comprising:
a computation module to,
receive, from at least one reviewer, a response to a plurality of questions associated with a plurality of dimensions, the plurality of dimensions being indicative of criteria for assessment of the visual design of the UI; and
compute an aggregate visual design quality index ($VDI_A$) score for the UI, wherein the $VDI_A$ score is computed based on the response received from the at least one reviewer, and a plurality of weighing factors corresponding to each of the plurality of dimensions; and
an evaluation module to compare the $VDI_A$ score with a pre-determined benchmark visual design quality index ($VDI_B$) score to evaluate the quality of the visual design of the UI,
wherein the computation module further,
obtains, from the at least one reviewer, in response to the plurality of questions, at least one visual design quality index (VDI) score corresponding to at least one category;
ascertains, based on the at least one VDI score, a dimension visual design quality index ($VDI_D$) score for each of the plurality of dimensions; and
computes, at least one UI visual design quality index ($VDI_{UI}$) score based on the $VDI_D$ score and the corresponding weighing factors, to evaluate the $VDI_A$ score,
a notification module to provide an evaluation report to a user including at least one of the $VDI_A$ score, the at least one VDI score, the $VDI_D$ score corresponding to each dimension, the at least one $VDI_{UI}$ score, the $VDI_B$ score, and suggestions with corrective measures for improving the quality of the visual design of the UI, wherein the suggested corrective measures are implemented in the visual design of UI,
wherein the computation of the $VDI_A$ score and the $VDI_B$ score provides standard criteria for evaluating the quality of the visual design of the UI, and the $VDI_A$ score and the $VDI_B$ score, the $VDI_{UI}$ score, the $VDI_D$ score are computed on a scale.

7. The evaluation system as claimed in claim 6, wherein the plurality of dimensions includes at least one of a design principle, a branding, and aesthetics.

8. The evaluation system as claimed in claim 6, wherein each of the plurality of dimensions includes the at least one category, and wherein the at least one category further includes at least one parameter.

9. The evaluation system as claimed in claim 6, wherein the computation module further receives, from a user, a response to a pre-assessment questionnaire, wherein the pre-assessment questionnaire pertains to details of the UI.

10. The evaluation system as claimed in claim 9, wherein the computation module determines the plurality of weighing factors based on the response to the pre-assessment questionnaire.

11. A non-transitory computer-readable medium having embodied thereon a computer program for executing a method for evaluating quality of a visual design of a user interface (UI), the method comprising:
receiving, from at least one reviewer, a response to a plurality of questions associated with a plurality of dimensions, the plurality of dimensions being indicative of criteria for assessment of the visual design of the UI;
computing an aggregate visual design quality index ($VDI_A$) score for the UI, wherein the $VDI_A$ score is computed based on the response received from the at least one reviewer, and a plurality of weighing factors corresponding to each of the plurality of dimensions; and
comparing the $VDI_A$ score with a pre-determined benchmark visual design quality index ($VDI_B$) score to evaluate the quality of the visual design of the UI,
wherein the computing further comprises:
obtaining, from the at least one reviewer, in response to the plurality of questions, at least one visual design quality index (VDI) score corresponding to at least one category;
ascertaining, based on the at least one VDI score, a dimension visual design quality index ($VDI_D$) score for each of the plurality of dimensions; and
computing, at least one UI visual design index ($VDI_{UI}$) score based on the $VDI_D$ score and the corresponding weighing factors, for evaluating the $VDI_A$ score,
providing an evaluation report to a user including at least one of the $VDI_A$ score, the at least one VDI score, the $VDI_D$ score corresponding to each dimension, the at least one $VDI_{UI}$, the $VDI_B$ score, and suggestions with corrective measures for improving the quality of the visual design of the UI, wherein the suggested corrective measures are implemented in the visual design of UI,
wherein the computation of the $VDI_A$ score and the $VDI_B$ score provides standard criteria for evaluating the quality of the visual design of the UI, and the $VDI_A$ score and the $VDI_B$ score, the $VDI_{UI}$ score, the $VDI_D$ score are computed on a scale.

12. The non-transitory computer-readable medium as claimed in claim 11, wherein the plurality of dimensions includes at least one of a design principle, a branding, and aesthetics.

13. The non-transitory computer-readable medium as claimed in claim 11, wherein each of the plurality of dimensions includes the at least one category, and wherein the at least one category further includes at least one parameter.

14. The non-transitory computer-readable medium as claimed in claim 11 further comprising receiving, from a user, a response to a pre-assessment questionnaire, wherein the pre-assessment questionnaire pertains to details of the UI.

15. The non-transitory computer-readable medium as claimed in claim 14 further comprising determining the plurality of weighing factors based on the response to the pre-assessment questionnaire.

* * * * *